US010266003B2

(12) United States Patent
Kawahara et al.

(10) Patent No.: US 10,266,003 B2
(45) Date of Patent: Apr. 23, 2019

(54) WHEEL AND A WHEELCHAIR USING THE SAME

(71) Applicants: HONDA MOTOR CO., LTD., Tokyo (JP); HONDA R&D SUN CO., LTD., Hayami-gun, Oita (JP)

(72) Inventors: Yoshihiro Kawahara, Saitama (JP); Yasuhiro Toguchi, Saitama (JP); Katsutoshi Tada, Saitama (JP); Ikumi Kurihara, Saitama (JP); Junji Takado, Saitama (JP); Norifumi Naono, Oita (JP)

(73) Assignees: HONDA MOTOR CO., LTD., Tokyo (JP); HONDA R&D SUN CO., LTD., Hayami-Gun (JP)

( * ) Notice: Subject to any disclaimer, the term of this patent is extended or adjusted under 35 U.S.C. 154(b) by 217 days.

(21) Appl. No.: 15/413,121

(22) Filed: Jan. 23, 2017

(65) Prior Publication Data

US 2017/0253075 A1 Sep. 7, 2017

(30) Foreign Application Priority Data

Mar. 7, 2016 (JP) .................................. 2016-043384

(51) Int. Cl.
*A61G 5/02* (2006.01)
*B60B 3/00* (2006.01)
*A61G 5/10* (2006.01)
*B60B 27/06* (2006.01)

(52) U.S. Cl.
CPC .............. *B60B 3/007* (2013.01); *A61G 5/022* (2013.01); *A61G 5/1051* (2016.11); *A61G 5/1091* (2016.11); *B60B 27/06* (2013.01)

(58) Field of Classification Search
CPC ........... B60B 3/002; B60B 3/007; B60B 3/04; B60B 3/02; B60B 3/12
See application file for complete search history.

(56) References Cited

U.S. PATENT DOCUMENTS

| | | | | | |
|---|---|---|---|---|---|
| 2,447,428 | A | * | 8/1948 | O'Leary | ................. B60B 11/10 301/38.1 |
| 3,004,798 | A | * | 10/1961 | Tylle | ..................... B60B 7/0006 301/37.104 |
| 4,660,893 | A | * | 4/1987 | Huntzinger | ........... B60B 7/0006 301/37.41 |
| 4,682,821 | A | * | 7/1987 | Strazis | ..................... B60B 7/12 301/37.42 |

(Continued)

FOREIGN PATENT DOCUMENTS

| | | | | |
|---|---|---|---|---|
| JP | 2012-19821 | * | 7/2010 | .............. A61G 5/02 |
| JP | 2012-019821 | | 2/2012 | |

*Primary Examiner* — Joseph M Rocca
*Assistant Examiner* — Michael R Stabley
(74) *Attorney, Agent, or Firm* — Rankin, Hill & Clark LLP

(57) ABSTRACT

Provided is a wheel which is inexpensive, light, and sufficiently rigid. A wheel 6a includes an annular rim 60 to which a tire 6b is externally fitted, a hub 61 which is arranged at a center portion of the rim 60 and to which an axle is connected, and a disk 62 which is attached with the rim 60 at a periphery portion and which covers one side of the wheel 6a. The disk 62 includes a planar portion 62a and a first rib 62b provided at a surface of one side of the planar portion 62a and extending in the radial direction. The planar portion 62a is provided with a first groove 62d at a surface of the other side at a position corresponding to the first rib 62b.

8 Claims, 8 Drawing Sheets

(56) References Cited

U.S. PATENT DOCUMENTS

| | | | | |
|---|---|---|---|---|
| 4,712,838 A * | 12/1987 | Berg | ............... | B60B 7/0006 |
| | | | | 301/37.41 |
| 4,729,604 A * | 3/1988 | Dietz | ............... | B60B 7/0006 |
| | | | | 301/37.104 |
| 4,836,615 A * | 6/1989 | Berg | ............... | B60B 7/0006 |
| | | | | 301/37.109 |
| 4,969,693 A * | 11/1990 | Molson | ............ | B60B 7/0006 |
| | | | | 301/37.11 |
| 4,978,174 A * | 12/1990 | Nosler | ............ | B60B 7/0006 |
| | | | | 301/37.11 |
| 5,131,727 A * | 7/1992 | Johnson | ............... | B60B 7/02 |
| | | | | 301/37.41 |
| D442,903 S * | 5/2001 | Brintouch | ............... | D12/204 |
| 6,942,302 B2 * | 9/2005 | Osterlund | ......... | B60B 7/0006 |
| | | | | 301/37.105 |
| 7,347,439 B2 * | 3/2008 | Young | ............ | B60B 7/0006 |
| | | | | 280/288.4 |
| 7,581,794 B1 * | 9/2009 | Milow | ............... | B60B 1/003 |
| | | | | 301/37.102 |
| 7,775,540 B2 * | 8/2010 | Young | ............... | B60B 7/0006 |
| | | | | 280/288.4 |
| 2006/0005440 A1 * | 1/2006 | Young | ............... | G09F 21/04 |
| | | | | 40/590 |

\* cited by examiner

WHEEL AND A WHEELCHAIR USING THE SAME

BACKGROUND OF THE INVENTION

Field of the Invention

The present invention relates to a wheel, especially a wheel of a wheelchair for racing used for track race, marathon, or the like.

Description of the Related Art

Conventionally, as a wheel used for a wheelchair, bicycle, or the like, there is known a wheel provided with an annular rim to which a tire is externally fitted, a hub arranged at a center portion of the rim and an axle connected thereto, and a plurality of spokes arranged between the rim and the hub extending in the radial direction (for example, refer to Patent Literature 1: Japanese Patent Laid-open No. 2012-19821).

SUMMARY OF THE INVENTION

Problems to be Solved by the Invention

However, according to the conventional wheel such as the one described in Patent Literature 1, there was a problem that the spokes were heavy and it was difficult to reduce the weight. On the other hand, if the spokes were reduced in weight by thinning the spokes or by forming the spokes with light material, there was a problem that sufficient rigidity could not be obtained for the whole wheel. Moreover, if the spokes were formed by light and rigid material, there was a problem that the manufacturing cost would become high since such material is expensive.

The present invention has been made in view of the above, and it is an object of the present invention to provide a wheel which is inexpensive and light with sufficient rigidity, and a wheelchair using the wheel.

Solution to the Problem

In order to achieve the above object, a wheel of the present invention includes an annular rim to which a tire is externally fitted, a hub arranged at a center portion of the rim and to which an axle is connected, and a disk which is attached with the rim at a periphery portion thereof and which covers between the rim and the hub, wherein the disk includes a planar portion and a rib, the rib being provided on a surface of the planar portion of one side in an axial line direction of the axle and including a radial direction vector in an extending direction vector, and wherein the planar portion is provided with a groove on a surface of the other side in the axial line direction of the axle at a position corresponding to the rib.

As such, in the wheel of the present invention, the disk arranged between the rim and the hub includes the planar portion and the rib provided on the surface of the planar portion at one side in the axial line direction of the axle which includes the radial direction vector in the extending direction vector. Moreover, the planar portion includes the groove at a position corresponding to the rib at the other side of the surface in the axial line direction of the axle. That is, the portion forming the side wall of the rib includes the radial direction vector in the extending direction vector and an axial line direction vector. Therefore, in this disk, the load in the radial direction which was applied to the spoke in the conventional wheel can be burden by the side wall. In other words, a part of the load which was conventionally burden only by the spoke, can be burden by the disk.

Moreover, in the wheel of the present invention, the planar portion is provided with a groove at a position corresponding to the rib on a surface of the planar portion at the other side in the axial line direction of the axle. That is, the rib is thinned from the rear surface. Therefore, the rib which burdens the load in the radial direction is light in weight compared to the spoke which similarly burdens the load in the radial direction.

Therefore, even if the spoke is omitted or the material of the spoke is lightened, it is possible to realize sufficient rigidity as the whole wheel. Moreover, in the case of omitting the spoke, it is possible to significantly reduce the manufacturing cost.

Moreover, according to the wheel of the present invention, the wheel includes a plurality of the ribs, wherein the plurality of the ribs include a first rib and a second rib, the second rib being unevenly arranged at a peripheral portion side of the disk than the first rib.

Since the rib extends in the radial direction, if they are uniformly provided in the circumferential direction, the rigidity of the peripheral portion side of the disk would be lower than the rigidity of the center portion (for example, a region around the hub). Therefore, by providing the second rib which is unevenly arranged at the peripheral portion side of the disk compared to the first rib, it is possible to reinforce the rigidity of the region of the peripheral portion side.

Moreover, it is preferable in the wheel of the present invention, in a case of providing a first rib and a second rib, the wheel includes a plurality of the first ribs, wherein the first ribs extend in a radial direction from the peripheral portion to a center portion of the disk, and wherein the second rib extends in the radial direction from the peripheral portion toward the center portion side of the disk, the second rib being shorter than the first ribs and being provided between the adjacent first ribs. According to such configuration, it is able to make the rigidity of the disk to become close to uniformity.

Moreover, it is preferable in the wheel of the present invention to include a plurality of the ribs, wherein the ribs extend in a radial direction from the periphery portion toward a center portion side of the disk, and wherein a fore end portion of at least one rib among the plurality of ribs is positioned closer to the peripheral portion than the center portion.

In a case of including a plurality of ribs extending toward the center portion side from the peripheral portion of the disk, when all of the ribs have the same length, the occupancy area of the rib at the center portion increases, and the stress concentrates at the center portion, thereby having a concern of causing trouble such as bending or the like at the center portion. Here, by positioning the fore end portion of a part of the ribs closer to the peripheral portion than the center portion, it is possible to reduce the stress concentrating at the center portion.

Moreover, it is preferable in the wheel of the present invention that the rib is formed to protrude toward a rim side. Generally, the disk covering the region between the rim and the hub is expected to exhibit the effect of reducing the air resistance. Therefore, by configuring as such, the effect of reducing air resistance by the disk is not deteriorated.

Moreover, it is preferable in the wheel of the present invention, when the rib is formed to protrude toward the rim side, the height of the rib is equal to or less than the width of the rim. According to such configuration, it is able to increase the rigidity without increasing the size of the disk.

In order to achieve the above object of the present invention, a wheelchair of the present invention is a wheelchair including: a cage having a sitting seat; a vehicle body frame extending forward of the cage: a steering handle provided at the vehicle body frame: a front wheel attached to a forward end portion of the vehicle body frame; and a pair of rear wheels attached to right and left of the cage, and is characterized in that each of the rear wheels is configured by the wheel of any of the above and a tire fitted to the wheel.

As such, by configuring the rear wheels of the wheelchair by using any of the wheels of above, it is able to lighten the weight and to reduce the manufacturing cost while maintaining the rigidity of the wheelchair as a whole.

Moreover, it is preferable in the wheelchair of the present invention that the wheel is arranged so that the disk is at a cage side. Generally, the rear wheels of the wheelchair are attached so that the upper side is inclined toward the cage side. That is, a larger load is applied to the disk at the cage side compared to the disk at the opposite side of the cage. Therefore, by arranging the disk at the cage side, it is possible to prevent the life of the wheel from shortening since the load can be burden by the disk with high rigidity.

Moreover, the wheelchair of the present invention may be configured to include a hand rim fixed to the wheel at an opposite side of the cage, wherein the wheel is arranged at the hub at the other side of the axle, and is attached with the rim at a periphery portion, and includes a cover which covers a region between the rim and the hub, and a fixing member which is fixed between the disk and the cover, and wherein the hand rim is fixed to the fixing member by a screw piercing the hand rim and the cover.

DESCRIPTION OF THE PREFERRED EMBODIMENTS

Hereinafter, the configuration of a wheelchair W according to an embodiment will be explained with reference to the drawings. The wheelchair W is a wheelchair used for track race, marathon, or the like.

First, referring to FIG. 1 to FIG. 3, the schematic configuration of the wheelchair W will be explained.

Figure 1:
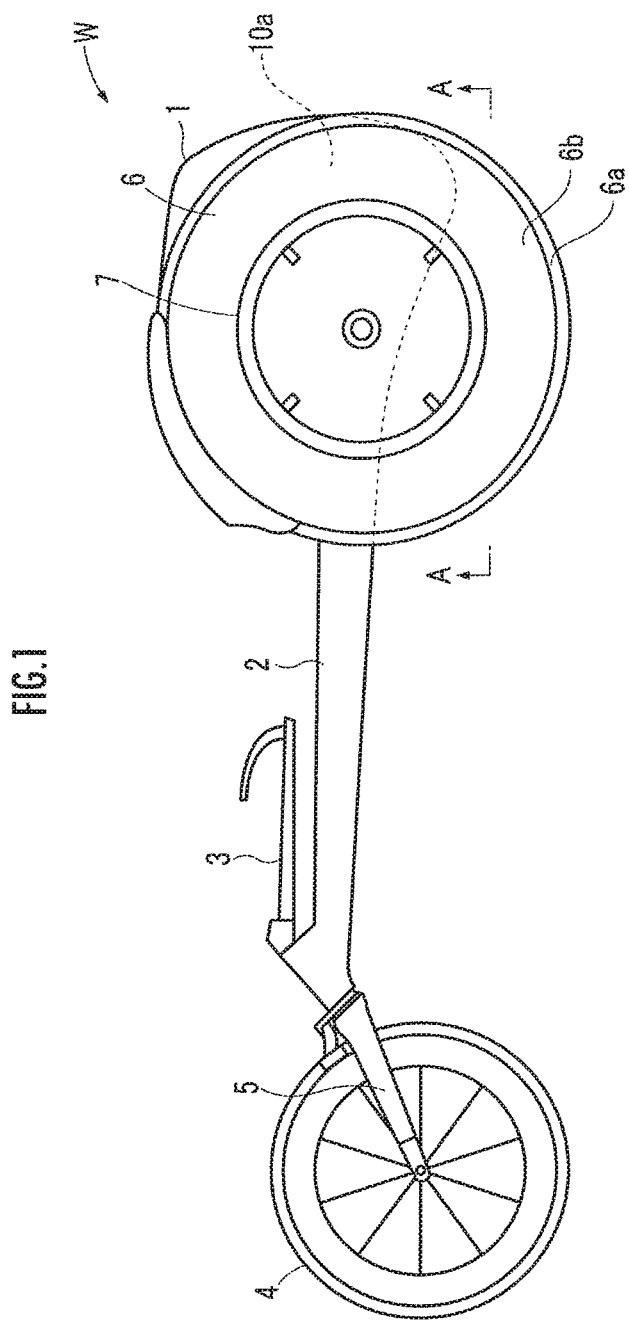
FIG. 1 is a side view illustrating a wheelchair according to an embodiment of the present invention.

As shown in FIG. 1, the wheelchair W includes a cage 1, a vehicle body frame 2 extending forward of the cage 1, a steering handle 3 provided at the vehicle body frame 2, a front wheel 4 arranged at a forward end portion of the vehicle body frame 2, a front fork 5 attached to the forward end portion of the vehicle body frame 2 and to which the handle 3 is connected and which holds the front wheel 4, a pair of rear wheels 6 attached to right and left of the cage 1, and a hand rim 7 attached to the rear wheel 6 at the opposite side of the cage 1.

Figure 2:
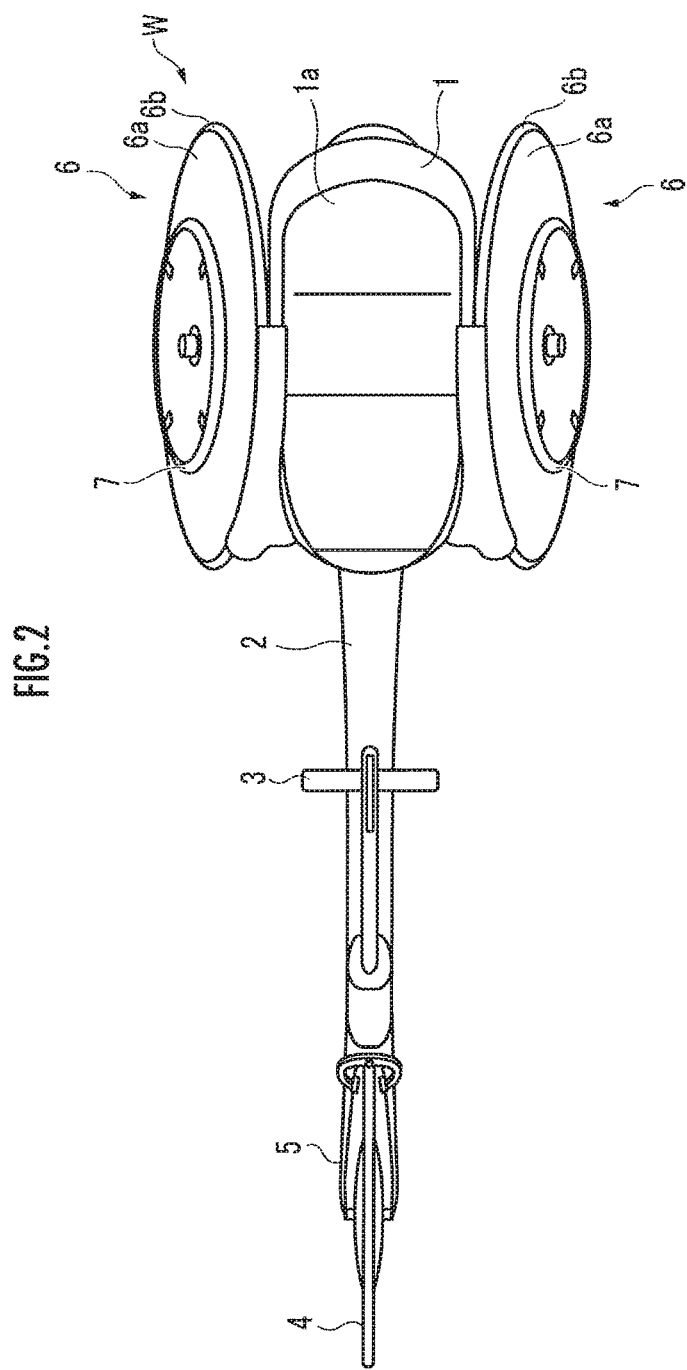
FIG. 2 is a plane view of the wheelchair of FIG. 1.

As shown in FIG. 2, the cage 1 is opened at the upper part and a sitting seat 1a on which the player (user) sits on is arranged inside the cage 1.

The handle 3 is connected to the end portion of the column 5a of the front fork 5 (refer to FIG. 3) pivotally supported by the end portion of the vehicle body frame 2. In the wheelchair W, by operating the handle 3, the orientation of the front wheel 4 is changed via the front fork 5, and the wheelchair W is able to be turned to travel in a desired direction.

The hand rim 7 is fixed such that it is able to integrally rotate with the rear wheel 6. The player seated on the sitting seat 1a transmits the driving force to the rear wheel 6 through the hand rim 7.

Figure 3:
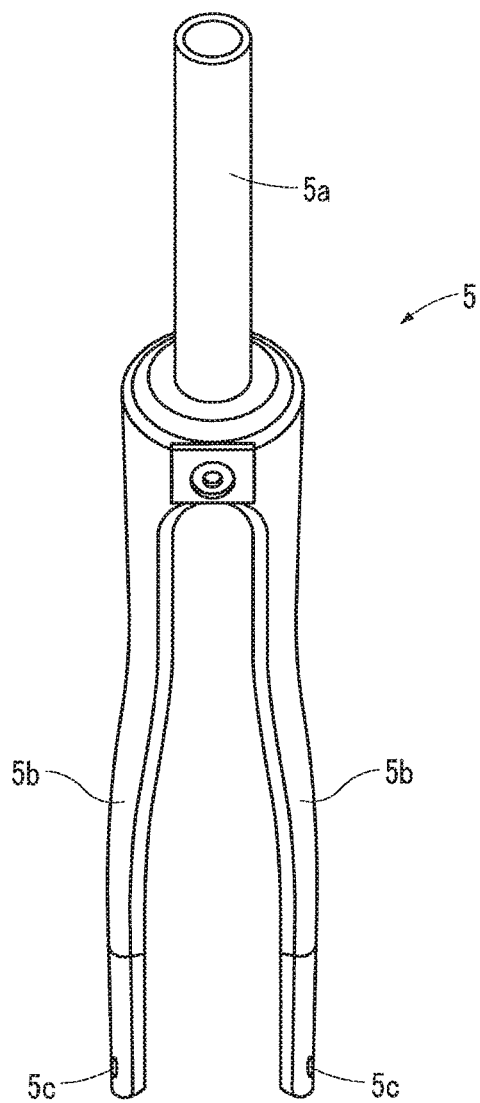
FIG. 3 is a plane view of a front fork of the wheelchair of FIG. 1.

As shown in FIG. 3, the front fork 5 includes a column 5a supported at the end portion of the vehicle body frame 2 and a fork portion 5b which extends forward to bifurcate from the column 5a. A bearing hole 5c which supports the axle of the front wheel 4 is formed at the end portion of the fork portion 5b.

The column 5a is cylindrically formed and is pivotally supported by the forward end portion of the vehicle body frame 2 via a bearing (not illustrated). Handle 3 (refer to FIG. 1) is fixedly provided at the upper end portion of the column 5a.

Next, with reference to FIG. 2 and FIG. 4 to FIG. 6, a wheel 6a of the rear wheel 6 of the wheelchair W is explained.

As shown in FIG. 2, the wheelchair W includes a pair of rear wheels 6 at the right and left of the cage 1. The rear wheel 6 is configured by a wheel 6a and a tire 6b fitted to the wheel 6a. The rear wheel 6 is attached to the cage 1 in a state inclined such that the upper side of the rear wheel 6 approaches more to the center side of the cage 1 side.

Figure 4:
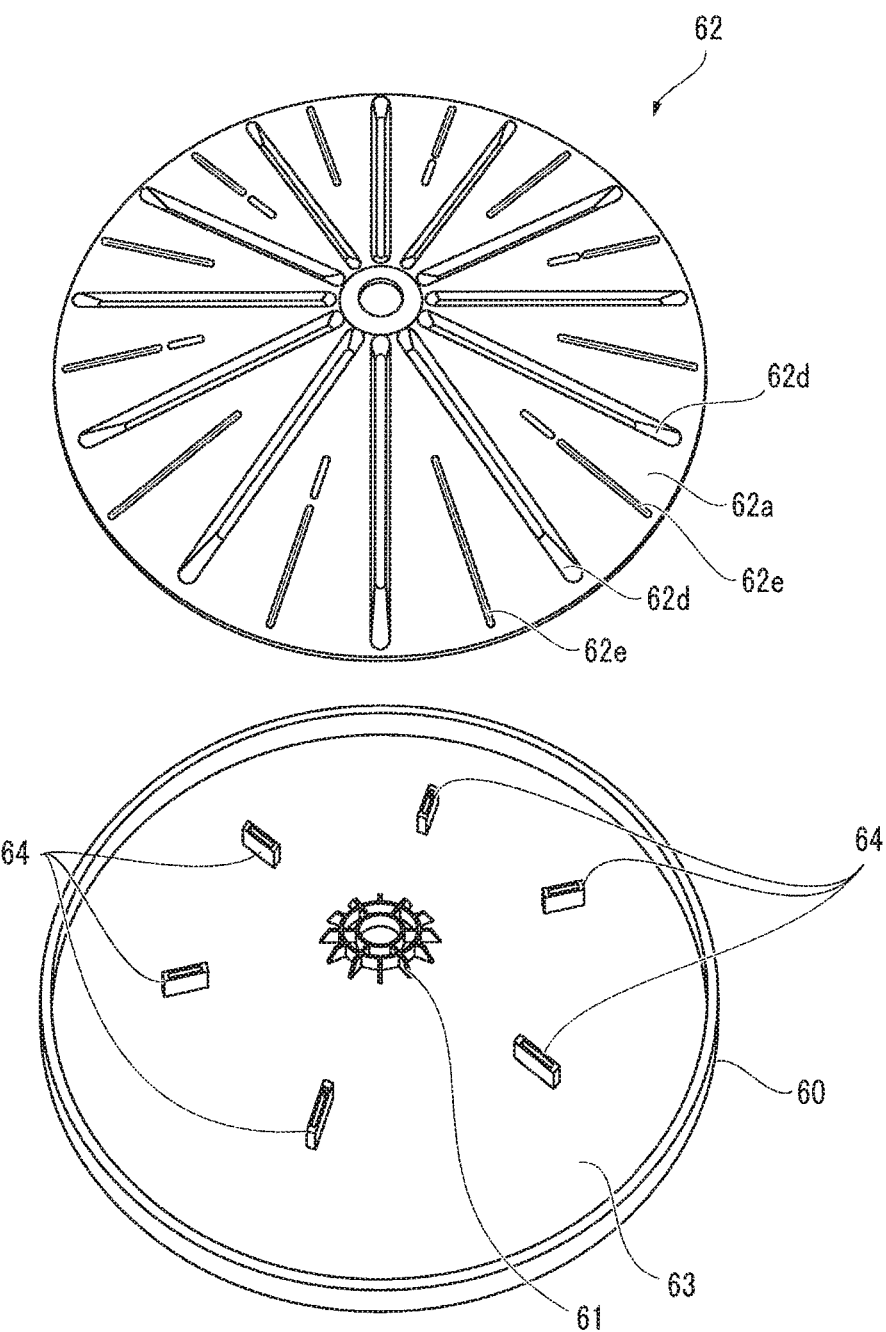
FIG. 4 is a disassembled perspective view seen from an attaching side of a wheel to a cage of the wheelchair of FIG. 1.

As shown in FIG. 4, the wheel 6a includes an annular rim 60 to which the tire 6b is externally fitted (refer to FIG. 2), a hub 61 arranged at a center portion of the rim 60 and to which an axle extending from the cage 1 is connected, a disk 62 which is attached with the rim 60 at a periphery portion thereof and which covers between the rim 60 and the hub 61 at the cage 1 side (one side in the axial line direction of the axle), a cover 63 which covers between the rim 60 and the hub 61 at a side opposite of the cage 1 (other side in the axial line direction of the axle), and fixing members 64 which are arranged between the disk 62 and the cover 63 at an equal interval in a circumferential direction.

The hand rim 7 is fixed to the fixing member 64 by a screw (not illustrated) which pierces the hand rim 7 and the cover 63.

The disk 62 and the cover 63 are formed by press processing after laminating metal such as iron or aluminum, or fiber-reinforced plastic or the like. As the fiber-reinforced plastic, for example, fiber-reinforced plastic using polyacrylonitrile (PAN)-based carbon fiber, aramid fiber-reinforced plastic, or fiber-reinforced plastic or the like reinforced by glass fiber, pitch-based carbon fiber, PBO fiber, polyarylate fiber, polyethylene fiber.

Here, the forming method and the forming material of the disk 62 and the cover 63 are not necessarily limited to such forming method and the forming material. For example, it may be formed by injection molding by using only resin material.

Figure 5:
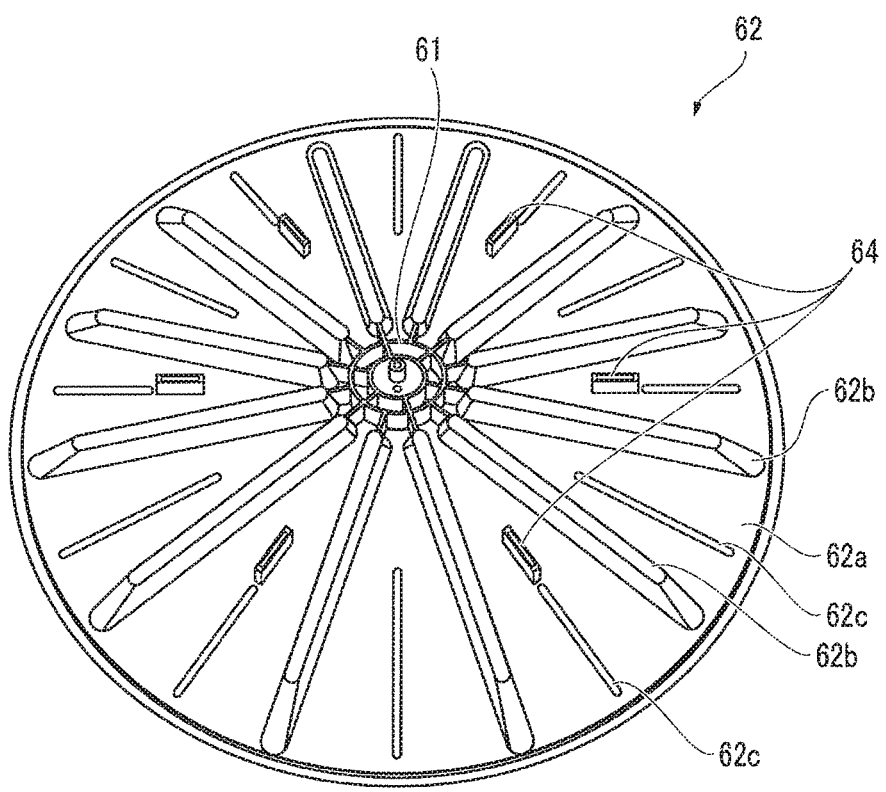
FIG. 5 is a rear surface view of a disk of the wheel of FIG. 4.

As shown in FIG. 5, the disk 62 includes a planar portion 62a, a plurality of first ribs 62b and a plurality of second ribs 62c provided at a surface of the planar portion 62a at the cage 1 side (one side in the axial line direction of the axle).

Figure 6:
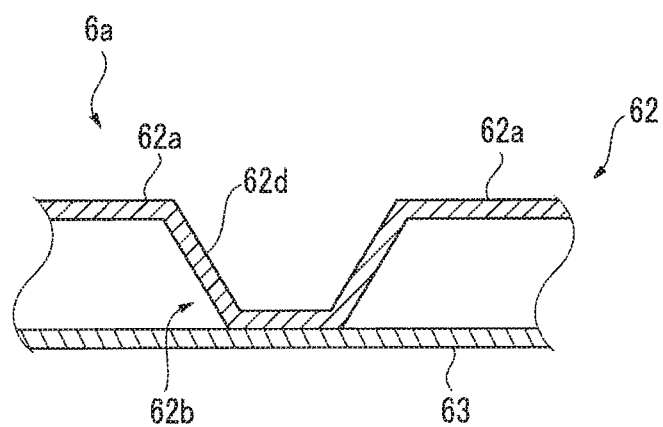
FIG. 6 is a schematic diagram illustrating an enlarged A-A line cross section of the wheel of the wheelchair of FIG. 1.

As shown in FIG. 6, the first ribs 62b are formed so as to protrude (convex) toward the cover 63 side (in other words the rim side). Similarly, the second ribs 62c are formed so as to protrude (convex) toward the cover 63 side. Moreover, the height of the first ribs 62b is formed to be equal to or less than the width of the rim 60. Similarly, the height of the second ribs 62c is formed to be equal to or less than the width of the rim 60.

Therefore, the first ribs 62b and the second ribs 62c do not protrude with respect to the rim 60 on either of the cage 1 side and the side opposite to the cage 1. Thus, the reduction effect of air resistance of disk 62 is not so much impaired by the first ribs 62b and the second ribs 62c.

Here, the protruding direction and the height of the first ribs 62b and the second ribs 62c are not limited to such configuration. For example, as long as it does not influence the reduction effect of the air resistance, they may be provided at the opposite side of the rim 60 or may have a height exceeding the width of the rim 60.

Moreover, as shown in FIG. 5, the second ribs 62c are unevenly arranged at a peripheral portion side of the disk 62 compared to the first ribs 62b. More specifically, the first ribs 62b extend in the radial direction from the peripheral portion to the center portion (a region in the vicinity of the hub 61) of the disk 62, and the second ribs 62c extend in the radial direction from the peripheral portion, and the second ribs 62c are shorter than the first ribs 62b and are provided between adjacent first ribs 62b.

In the wheelchair W, the first ribs 62b and the second ribs 62c extend in the radial direction. Therefore, in the case of configuring the first ribs 62b and the second ribs 62c to have the same length and also providing them uniformly in the circumferential direction, the rigidity of the disk 62 at the peripheral portion side would be lower than the rigidity of the center portion. Therefore, in the wheelchair W, second ribs 62 c which are shorter than the first ribs 62b are unevenly arranged between the first ribs 62b closer to the peripheral portion side of the disk 62 compared to the first ribs 62b, thereby attaining to equalize the rigidity of the disk 62.

Moreover, in the wheelchair W, the first ribs 62b and the second ribs 62c are provided in a shape extending in the radial direction in order to effectively burden the load. However, the extending direction vector of the ribs is not limited to the radial direction and may be any direction as long as it includes the radial direction vector in the extending direction vector. Moreover, the position of forming the second ribs 62c may be appropriately changed according to the rigidity required for the wheel 6a. Moreover, only ribs having the same shape may be formed.

The planar portion 62a is provided with first grooves 62d and second grooves 62e at a surface on opposite side of the cage 1 (the other side in the axis line direction of the axle) at a position corresponding to the first ribs 62b and the second ribs 62c. That is, the first ribs 62b and the second ribs 62c are made thin from the rear surface.

Therefore, the first ribs 62b and the second ribs 62c to which the load is applied in the radial direction are light compared to the spokes which similarly burden the load in the radial direction.

As explained above, in the wheel 6a, the disk 62 arranged between the rim 60 and the hub 61 includes the planar portion 62a and also the first ribs 62b and the second ribs 62c which are provided on the surface of the planar portion 62a at the cage 1 side (one side in the axial line direction of the axle) and which include the radial direction vector in the extending direction vector. Moreover, the planar portion 62a is provided with the first grooves 62d and the second grooves 62e on the surface of opposite side of the cage 1 (the other side in the axial line direction of the axle) at a position corresponding to the first ribs 62b and the second ribs 62c.

In other words, in the wheel 6a, the portions which are the side walls of the first ribs 62b and the second ribs 62c include the radial direction vector in the extending direction vector and the axial line direction vector.

Therefore, in the disk 62, the load in the radial direction which was burden by the spoke in the conventional wheel is burden by this side wall. That is, a part of the load which was conventionally burden only by the spoke is burden by the disk 62.

Therefore, even if the spokes are omitted, sufficient rigidity is realized by the wheel 6a as a whole. Moreover, since the spokes are omitted, the manufacturing cost is reduced to a great extent.

By the way, in the wheelchair W, the rear wheel 6 is attached so that the upper part of the rear wheel 6 is inclined toward the cage 1 side. That is, in the wheelchair W, larger load is applied to the disk 62 at the cage 1 side compared to the cover 63 at the opposite side of the cage 1. This is to make the disk 62, which has a higher rigidity than the cover 63, burden the load by arranging the disk 62 at the cage 1 side, thereby to prevent the shortening of the life of the wheel 6a.

Figure 7:
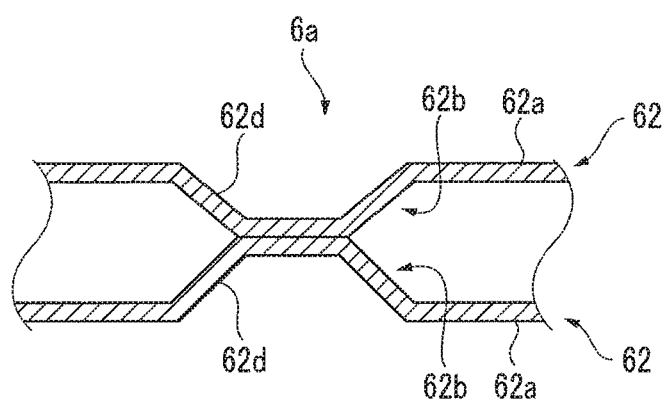
FIG. 7 is a schematic diagram illustrating an enlarged cross section of a wheel of a wheelchair according to a first modified example.

However, the wheel 6a is not necessarily limited to such configuration. For example, as the first modified example shown in FIG. 7, instead of one disk 62 and the cover 63, the wheel 6a may be configured by using two disks 62 so as to oppose each other.

Although the illustrated embodiment has been explained above, the present invention is not limited to such mode.

For example, in the above embodiment, the wheel 6a according to the present invention is applied to the wheelchair W. However, the wheel of the present invention is not only applicable to a wheelchair, but is also applicable to wheels of other transportations such as a bicycle or the like.

Moreover, the above embodiment does not provide a spoke to the wheel 6a. However, the wheel of the present invention may be configured to include a spoke.

Moreover, in the above embodiment, the side of the wheel 6a opposite to the cage 1 is covered by the cover 63. However, the wheel of the present invention may cover the side opposite to the cage by using a disk formed with ribs and grooves instead of the cover. In such case, the cage side of the wheel may be covered with a cover which is not formed with ribs and grooves instead of the disk.

Figure 8:
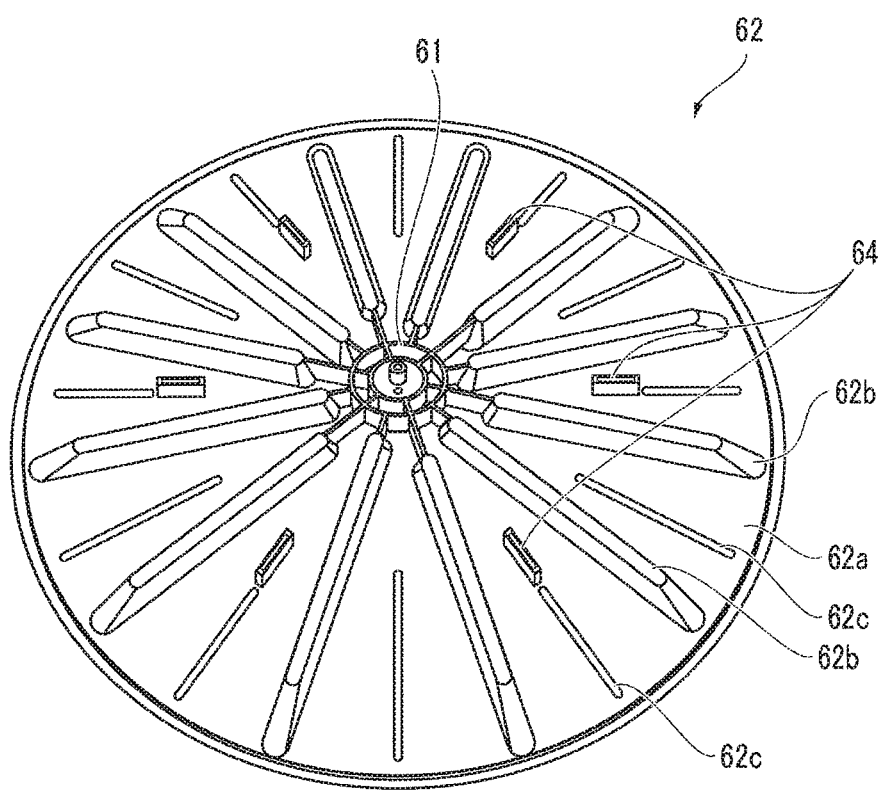
FIG. 8 is a rear surface view of an enlarged vicinity of a center portion of a disk of a wheelchair according to a second modified example.

Moreover, according to the above embodiment, as shown in FIG. 5, all of the first ribs 62b uniformly have the same length. However, the wheel of the present invention is not limited to such configuration. For example, as the second modified example show in FIG. 8, the predetermined length of the first ribs 62b may be changed so that at least one of the end portion of the first ribs 62b (half of the first ribs 62b in the second modified example) is positioned more closer to the peripheral portion than the center portion.

In the case of configuring as above, it is possible to reduce the stress concentrated in the peripheral region in which the hub 61 is arranged. As a result, it is possible to prevent the occurrence of defects such as bending or the like at that portion.

EXPLANATION OF REFERENCE SIGNS

1 . . . cage, 1a . . . sitting seat, 2 . . . vehicle body frame, 3 . . . handle, 4 . . . front wheel, 5 . . . front fork, 5a . . . column, 5b . . . fork portion, 5c . . . bearing hole, 6 . . . rear wheel, 6a . . . wheel, 6b . . . tire, 7 . . . hand rim, 60 . . . rim, 61 . . . hub, 62 . . . disk, 62a . . . planar portion, 62b . . . first rib, 62c . . . second rib, 62d . . . first groove, 62e . . . second groove, 63 . . . cover, 64 . . . fixing member, W . . . wheelchair

What is claimed is:

1. A wheel comprising:
an annular rim to which a tire is externally fitted,
a hub arranged at a center portion of the rim and to which an axle is connected, and
a disk which is attached with the rim at a periphery portion thereof and which covers between the rim and the hub,
wherein the disk includes a planar portion and a plurality of ribs, the plurality of ribs being provided on a surface of the planar portion on one side in an axial line direction of the axle and including a radial direction vector in an extending direction vector,
wherein the planar portion is provided with a groove on a surface of the other side in the axial line direction of the axle at a position corresponding to each of the plurality of ribs, and
wherein the plurality of the ribs include a first rib and a second rib, the second rib being unevenly arranged at a peripheral portion side of the disk than the first rib.

2. The wheel according to claim 1, comprising a plurality of the first ribs,
wherein the first ribs extend in a radial direction from the peripheral portion to a center portion of the disk, and
wherein the second rib extends in the radial direction from the peripheral portion toward the center portion side of the disk, the second rib being shorter than the first ribs and being provided between the adjacent first ribs.

3. The wheel according to claim 1,
wherein the plurality of ribs each extend in a radial direction from the periphery portion toward a center portion side of the disk, and
wherein a fore end portion of at least one rib among the plurality of ribs is positioned closer to the peripheral portion than the center portion.

4. The wheel according to claim 1, wherein each of the plurality of ribs is formed to protrude toward a rim side.

5. The wheel according to claim 4, wherein a height of each of the plurality of ribs is equal to or less than a width of the rim.

6. A wheelchair comprising:
a cage having a sitting seat;
a vehicle body frame extending forward of the cage:
a steering handle provided at the vehicle body frame:
a front wheel attached to a forward end portion of the vehicle body frame; and
a pair of rear wheels attached to right and left of the cage,
wherein each of the rear wheels is configured by the wheel of claim 1 and a tire fitted to the wheel.

7. The wheelchair according to claim 6, wherein the wheel is arranged so that the disk is at a cage side.

8. The wheelchair according to claim 6, comprising:
a hand rim fixed to the wheel at an opposite side of the cage,
wherein the wheel is arranged at the hub at the other side of the axle, and is attached with the rim at a periphery portion, and includes a cover which covers a region between the rim and the hub, and a fixing member which is fixed between the disk and the cover, and
wherein the hand rim is fixed to the fixing member by a screw piercing the hand rim and the cover.

* * * * *